Figure 1:
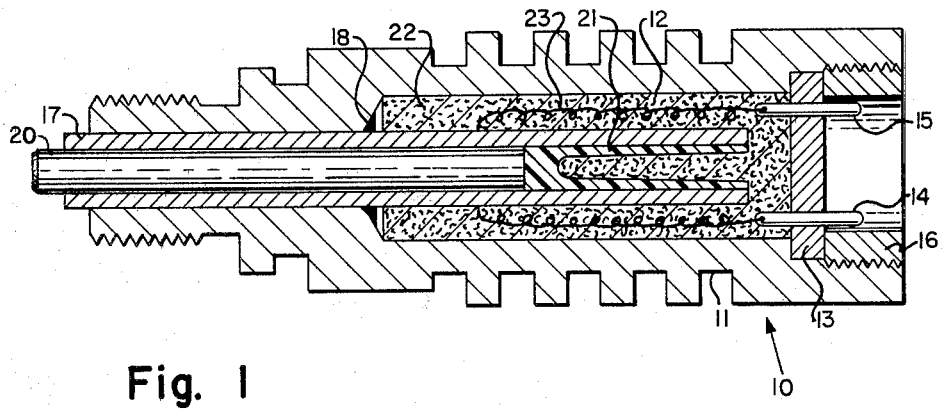

Aug. 2, 1966   W. L. CARLSON, JR., ET AL   3,263,411

CONTROL APPARATUS

Filed Aug. 2, 1965

INVENTORS
WILLIAM L. CARLSON JR.
JAMES E. COX
RICHARD HANKINS DEAN

BY Robert O. Vidas

ATTORNEY

United States Patent Office 3,263,411
Patented August 2, 1966

3,263,411
CONTROL APPARATUS
William L. Carlson, Jr., and James E. Cox, Minneapolis, and Richard Hankins Dean, Buffalo, Minn., assignors to Honeywell Inc., Minneapolis, Minn., a corporation of Delaware
Filed Aug. 2, 1965, Ser. No. 476,399
6 Claims. (Cl. 60—23)

This invention relates to control apparatus and more specifically to a thermal actuator of the type wherein a quantity of thermally expansible material is disposed in a pressure chamber and is selectively heated or cooled to cause expansion or contraction of the material to in turn affect movement of an output member. Specifically, the invention relates to a thermal actuator utilizing an improved thermally expansible material which renders the actuator useable under a greater variety of ambient temperature conditions than has been possible with previous actuators of this general type.

Actuators operated by a thermally expansible material such as wax, have been in use for many years. Some of these actuators, as may be exemplified by the typical automobile radiator thermostat, are designed so that they are responsive to changes in ambient temperature. Others utilize electrically energizable heaters to vary the temperature of the thermally expansible material to control the position of an output member operated thereby. Actuators of the latter type are particularly applicable as operators for valves, switches and the like since a very small actuator, utilizing a relatively small and low power heater which may be controlled by a conventional condition responsive device, can be used to provide a very high force output. However, such actuators have not been without problems. Many expansible materials, such as waxes, have thermal expansion characteristics such that they undergo rather substantial volumetric changes at temperatures low enough so that they are materially affected by ambient temperature. Another difficulty has been that many of the same type of materials become unstable at high temperatures and pressures. Therefore, the ranges of temperatures over which actuators of this type could be used have been limited.

It is known that there are certain materials, especially certain synthetic waxes, which have very little volumetric change at normal ambient or environmental temperatures, which have an abrupt increase in the rate of thermal expansion over a predetermined increment of relatively high temperatures, and which can withstand relatively high temperatures and pressures without becoming unstable. However, all materials in this category which we have investigated and of which we are aware, have the undesirable characteristic that at relatively low temperatures, for example below about 100° F., the material is brittle and nonplastic.

Generally actuators of this type have the electric heater disposed in the pressure chamber of the actuator and embedded in the expansible material in order to obtain the greatest efficiency from the heater. A number of difficulties have been found to occur when thermally expansible materials of the type last described are used in this type of actuator. During the expansion and contraction of the thermally expansible material, that portion of the material which is in a solid state and at relatively low temperatures is so brittle and so nonplastic that it has a tendency to fracture and cause breakage of the heating element embedded therein or to tear the electrical leads from the heating element. Another problem has been that often, upon contraction and solidification of the material, voids result in the material and reduce the response time when the heater is again energized and, in some cases, cause hot spots which overheat when the heater is again energized. Also, when such voids occur in the expansible material as it cools, the output member cannot fully return. As greater loads are applied to the output member, these problems appear to multiply.

Our invention substantially overcomes these problems. It provides an actuator utilizing a novel thermally expansible material which is substantially unaffected by normal ambient temperature changes, which is relatively incompressible and thermally stable over the range of temperatures and pressures encountered in the chamber, and has sufficient plasticity at relatively low temperatures so that the problems of heater breakage and the occurrence of voids in the material upon cooling are substantially eliminated. This has been accomplished by adding to a thermally expansible material having the desired temperature characteristics and high temperature stability, an organic material which is an incompressible liquid over the entire range of pressures and temperatures encountered in the actuator, has an insignificant rate of thermal expansion and contraction over this range of temperatures, is noncorrosive, electrically nonconductive, and incompressible, but which is readily miscible with the first material so that the two materials form a substantially homogeneous mixture which does not separate when the first material is in either its solid or liquid state.

By way of example, an actuator constructed according to our invention and utilizing the improved expansible mixture will be described in detail in the following description wherein reference is made to the drawing. In the drawing, FIGURE 1 discloses in longitudinal cross section, a thermal actuator utilizing our invention.

Figure 2:
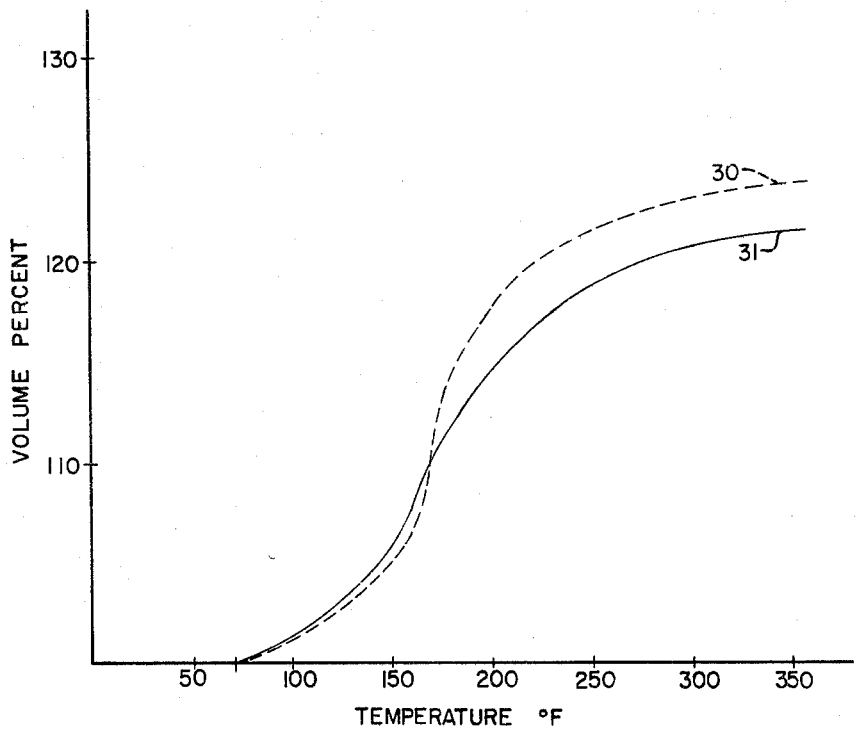

FIGURE 2 is a graph of thermal expansion characteristics of a typical expansible material and of such a material combined with another according to our invention.

Referring to FIGURE 1, reference numeral 10 generally designates a thermal actuator having a body 11 with a cavity 12 formed therein. Cavity 12 forms a pressure chamber for the actuator and is closed at one end by a header 13 which has a pair of electrically conductive terminal members 14 and 15 extending therethrough and hermetically sealed with respect thereto. Header 13 is held in fluid tight engagement with the body 11 by appropriate means such as a threaded member 16. At the opposite end of chamber 12, an elongated tubular member 17 extends longitudinally of the actuator, from the exterior of the body and a substantial distance into chamber 12. Member 17 is sealingly secured to body 10 as by brazing 18. A cylindrical output shaft 20 is disposed in member 17 and is axially movable with respect thereto. A fluid tight seal is provided between chamber 12 and output shaft 20 by appropriate sealing means such as a flexible cup-shaped sealing member 21 disposed so that as the pressure in chamber 12 increases, the sealing member is pressed tightly into engagement with the inner walls of tubular member 17 to provide a fluid tight seal. Chamber 12 is substantially filled with a thermally expansible material 22 which has an electric heater 23 embedded therein. Heater 23 has its opposite ends connected to the electrical terminals 14 and 15, which terminals are in turn connected to an appropriate source of electrical current and appropriate control means, such as a thermostat (not shown).

As indicated previously herein, there are various types of thermally expansible materials which might be used in chamber 12. However, the number of applicable materials is substantially reduced if one desires to have an actuator which will be substantially unaffected by variations in ambient temperatures but which will remain stable at the relatively high temperatures encountered inside of chamber 12. Our investigation disclosed that certain synthetic waxes displayed the proper temperature characteristics and were capable of withstanding relatively high temperatures without undergoing a breakdown. However, all materials having these characteristics of which we are aware, had the undesirable characteristic of being extremely brittle and nonplastic at lower temperatures. As indicated previously, this results in a number of problems including the destruction of the heater and its connection to the electrical terminals within the chamber as well as the occurrence of voids in the expansible material as it cools.

Our investigation resulted in an actuator which is useable in ambient temperatures varying from approximately 30° F. to 140° F. without being substantially affected by ambient changes within this range. We found that in order to be useable in this actuator, the thermally expansible materials have to be stable at temperatures of 400° to 450° F. since temperatures in this range would be experienced in the actuator, at least by the material immediately adjacent the heater. As used herein, the term "thermally stable" refers to chemical stability at least up to temperatures in this range. It is also desirable that the material undergo most of its thermal expansion over a relatively narrow temperature range so that continued heating to relatively high temperatures will not result in a continued expansion of the material and consequently a continued movement of the output shaft.

One available material which we found to meet these requirements is a synthetic wax know as Rock Wax, manufactured by the International Wax Refining Company. We found that this material had a relatively low rate of thermal expansion at temperatures below about 100° F. and, in fact, had a very little expansion up to about 140° F. Its major thermal expansion was found to take place between about 140° and about 180° F. and above that temperature the rate of thermal expansion again became relatively low. We also found that the material was stable at the maximum temperatures encountered within the actuator. The thermal expansion characteristics of this material are shown by curve 30 of FIGURE 2. In this figure, the volume of the material has been arbitrarily chosen at 100% at 70° F. and the volume at temperatures above 70° F. expressed as a percentage of this base or reference volume. However, the problem of extreme brittleness at lower ambient temperatures, below about 100° F., and particularly below about 60° or 70° F., was encountered.

We have found that this problem of brittleness and nonplasticity can be substantially overcome without substantially affecting the thermal expansion characteristics of the wax by mixing with the wax a quantity of an organic material such as an oil. In order to be completely satisfactory, however, this second material must be readily miscible in the wax, it must have a substantially insignificant rate of thermal expansion over the entire range of temperatures encountered in the pressure chamber, it must be noncorrosive, relatively incompressible and electrically nonconductive and must be stable over the entire range of temperatures and pressures encountered in the pressure chamber. We found that a mixture of a natural paraffin oil with the Rock Wax provided a thermally expansible material having temperature characteristics which vary only slightly from the pure Rock Wax, the temperature characteristics at ambient temperatures being substantially unchanged but the maximum expansion being decreased somewhat in proportion to the amount of paraffin oil added to the wax. Curve 31 of FIGURE 2 shows this thermal expansion characteristic. This mixture was found to have sufficient plasticity so that the problems previously encountered were substantially overcome and the actuator thus rendered useable over the desired range of ambient temperatures. We also found that the maximum volumetric expansion can be modified conveniently by simply varying the amount of paraffin oil added to the wax.

The use of Rock Wax with paraffin oil to increase the plasticity thereof is given by way of example above. The thermally expansible material may be an organic material having the previously described thermal expansion characteristics and which is incompressible and thermally stable over the range of temperatures and pressures encountered. It should also have at least some degree of lubricity and should be electrically nonconductive since it is generally desirable to embed the electric heater directly in the material. Likewise, any organic oil having the properties described above may be used to increase the plasticity of the thermally expansible material. It is to be understood that the detailed description given herein is by way of example only and not by way of limitation and it is contemplated that various modifications may become apparent to those skilled in the art in view of our disclosure. Therefore, our invention is to be limited solely by the scope of the appended claims.

We claim:

1. A thermal actuator comprising: a body having a pressure chamber therein; an output member associated with said body and movable with respect thereto in response to pressure changes in said chamber; heater means associated with said body and operable to elevate the temperature in said chamber; and a thermally expansible fill in said chamber, said fill comprising a mixture of two classes of organic materials including a first material characterized in that it is a relatively incompressible, thermally stable substance having a comparatively low rate of thermal expansion at temperatures below about 100° F., a comparatively high rate of thermal expansion over a predetermined temperature increment occurring above 100° F., and a comparatively low rate of thermal expansion at temperatures above said predetermined temperature increment, said first material further being characterized in that it is normally brittle and relatively nonplastic at temperatures below about 100° F., and said mixture including a second material characterized in that it is an oil which remains a substantially incompressible liquid over the entire range of temperatures and pressures normally encountered in said chamber and has a relatively low rate of thermal expansion over said normal range, is electrically nonconductive and noncorrosive, and is readily miscible in said first material, said second material substantially increasing the plasticity of said fill over that exhibited by said first material alone without substantially changing the thermal expansion characteristics of said first material.

2. The thermal actuator of claim 1 wherein said mixture of said first and second organic materials includes between about 75% and about 95% of said first organic material by weight.

3. The thermal actuator of claim 2 wherein said heater means is an electrically energizable resistance heater disposed in said chamber and imbedded in said expansible fill, and wherein both said first and second organic materials are electrically nonconductive.

4. The thermal actuator of claim 3 wherein said first material has a relatively low rate of thermal expansion below about 140° F. and above about 180° F., but has a substantially greater rate of thermal expansion between about 140° F. and 180° F. and is thermally stable at temperatures up to about 450° F.

5. The thermal actuator of claim 4 wherein said mixture of said first and second organic materials includes about 85% of said first material and about 15% of said second material.

6. The thermal actuator of claim 5 wherein said first organic material is a synthetic wax and said second organic material is a natural paraffin oil.

References Cited by the Examiner
UNITED STATES PATENTS

| | | |
|---|---|---|
| 2,736,604 | 2/1956 | Albright. |
| 2,785,132 | 3/1957 | Frey _____ 73—368.3 X |
| 3,212,337 | 10/1965 | McCarrick. |

EDGAR W. GEOGHEGAN, *Primary Examiner.*